Jan. 23, 1923. 1,443,222
H. A. JOHNSON.
FARM IMPLEMENT.
FILED MAY 19, 1921. 2 SHEETS-SHEET 1
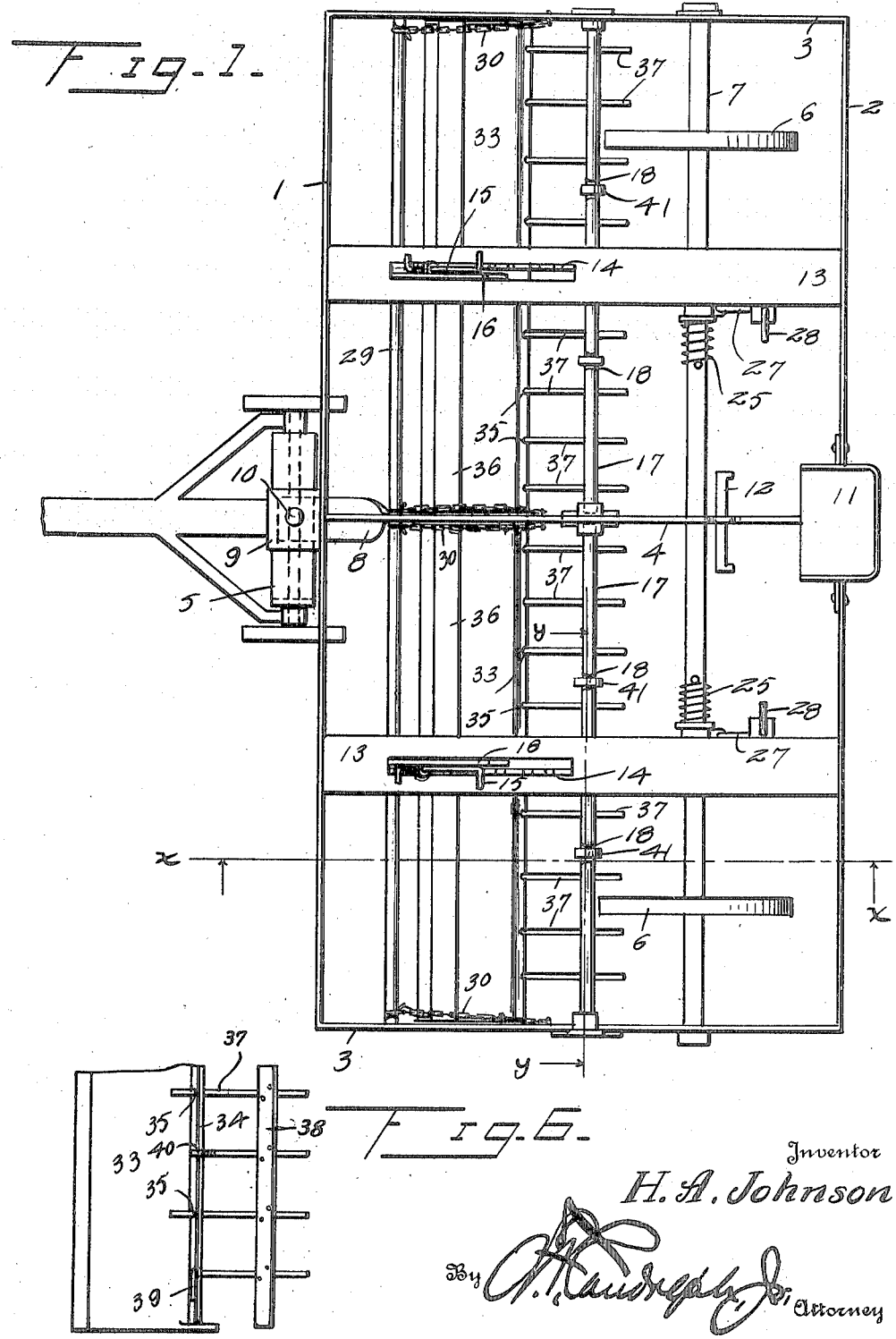
Inventor
H. A. Johnson
By Attorney

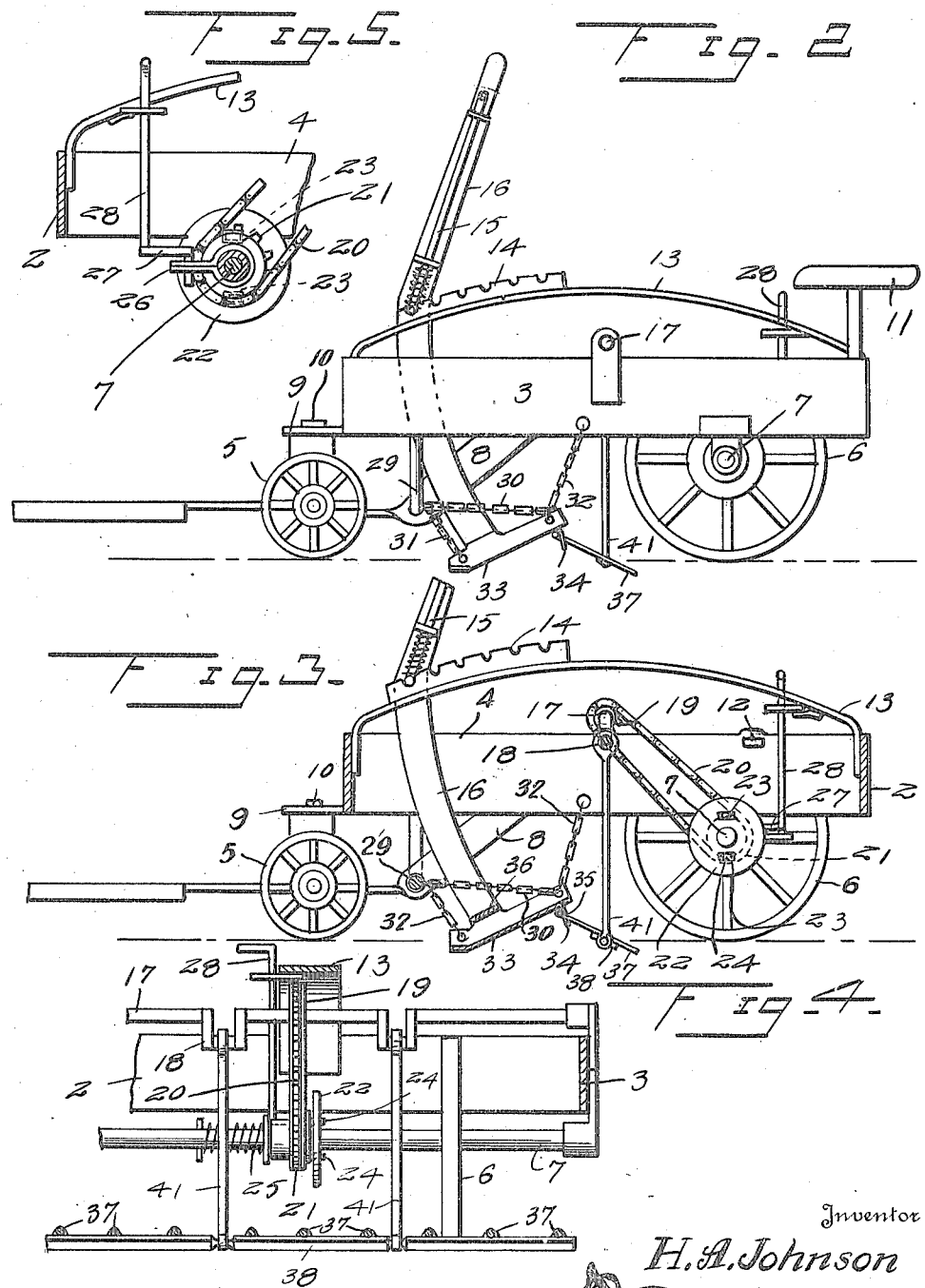

Patented Jan. 23, 1923.

1,443,222

UNITED STATES PATENT OFFICE.

HENRY A. JOHNSON, OF BADGER, MINNESOTA.

FARM IMPLEMENT.

Application filed May 19, 1921. Serial No. 470,781.

*To all whom it may concern:*

Be it known that I, HENRY A. JOHNSON, a citizen of the United States, residing at Badger, in the county of Roseau and State of Minnesota, have invented certain new and useful Improvements in Farm Implements; and I do hereby declare the following to be a full, clear, and exact description of the invention, such as will enable others skilled in the art to which it appertains to make and use the same.

The invention aims primarily to provide a machine for tilling the soil intermediate the plowing thereof and the sowing of the seed, whereby to break up clods, level the ground and leave roots, weeds and the like on the surface of the ground.

The invention consists of an implement embodying a wheeled frame, cutting blades, shaking rakes coacting with the blades, means for adjusting the depth and pitch of the blades, and operating means for the shaking rakes capable of being thrown into and out of action, the several parts being at all times under control of the driver and operable without necessitating stopping of the machine to effect adjustment.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a top plan view of an agricultural implement embodying the invention, Figure 2 is a side view thereof, Figure 3 is a section on the line *x—x* of Figure 1, looking in the direction of the arrows, Figure 4 is a section on the line *y—y* of Figure 1, Figure 5 is a detail view of the drive mechanism for the shaking rake showing more clearly the clutch, and Figure 6 is a detail view of a portion of one of the cutting blades and the coacting shaking rake.

Corresponding and like parts are referred to in the following description and designated in the several views of the drawings by like reference characters.

The implement embodies a main frame mounted upon wheels and substantially of rectangular formation and comprising a front bar 1, a rear bar 2, side bars 3 and an intermediate bar 4 paralleling the side bars and connecting the front and rear bars midway of their ends. The main frame is mounted upon a front truck 5 and rear wheels 6, the latter being secured to an axle 7 disposed near the rear bar 2 and mounted in bearings applied to the side bars 3. A strap 8 is attached at its upper rear end to the intermediate bar 4 and inclines downwardly and forwardly. A lug 9 extends forwardly from the front bar 1 and is in vertical line with the lower forward portion of the strap 8. A bolt or pivot pin 10, supported in the lug 9 and forward end of the strap 8, pivotally connects the truck 5 to the main frame. The driver's seat 11 is centrally mounted upon the rear bar 2, and a footrest 12 is carried by the rear portion of the intermediate bar 4. Arched bars 13, disposed upon opposite sides of the intermediate bar 4, are attached at their ends to the respective bars 1 and 2. Longitudinal slots are formed in the forward portions of the arched bars 13 and teeth 14 are disposed at the sides of the longitudinal slots to coact with hand latches 15 mounted upon operating levers 16 whereby to hold the latter in adjusted position.

Transversely alined shafts 17 are mounted in bearings applied to the side bars 3 and intermediate bar 4 and include crank portions 18. A sprocket wheel 19 is fast to each of the shafts 17 and a drive chain 20 cooperates therewith. Sprocket wheels 21, mounted on the axle 7, coact with the drive chains 20 and impart movement thereto. The sprocket wheels 21 are loose on the axle 7 and have clutch engagement therewith to admit of throwing the shaft 17 into or out of action. Disks 22, fixed on the axle 7 for rotation therewith have openings 23 to receive studs 24 carried by and rotatable with the sprocket wheels 21 whereby to clutchingly connect said sprocket wheels with the said axle for rotation therewith when the drive chains 20 and shaft 17 are required to be driven. Expansible helical springs 25, mounted on the axle 7, normally exert a lateral pressure against the sprocket wheels 21 whereby to hold the studs 24 in engagement with the openings 23 of the clutch disks 22. Each of the sprocket wheels 21 is provided with an arm 26 and has connection with a crank 27 of the lower end of a vertical shaft 28 mounted in a bearing near the rear end of each of the arched bars 13. Upon operating the vertical shaft 28, the sprocket wheels 21 may be thrown into or out of clutched engagement with the axle 7.

A rod 29, disposed near the front of the machine, has its end portions upturned and secured to the side bars 3. The rod 29 is engaged intermediate of its ends by the strap 8 and is strengthened and braced thereby. Draft chains 30 are attached to the rod 29 near the outer ends thereof and intermediate said ends. Suspending chains 31 are also connected to the rod 29 at corresponding points. Rear suspending chains 32 are attached to the side bars 3 and coact with the draft chains 30 in a manner presently to be explained.

Transversely alined cutting blades 33 are disposed in the rear of the rod 29 and are supported by means of the suspending chains 31 and 32. The end portions of the cutting blades 33 are upturned and the several chains 30, 31 and 32 are attached thereto. The rear portion of each of the cutting blades 33 inclines upwardly and rearwardly thereby leaving the front portion of each of the blades substantially in a horizontal plane or slightly inclined. The rear portion of each of the cutting blades 33 is downturned, as indicated at 34, and is apertured at regular intervals, as indicated at 35, to receive the tines of rakes disposed in the rear of the cutting blades. Each of the cutting blades 33 is provided with a bail 36 to which the lower end of an operating lever 16 is centrally attached. The pitch of the cutting blades 33 is varied by moving the operating levers 16 in the slots of the arched bars 13, said levers being made secure in the adjusted position by means of the hand latches 15 cooperating with the teeth 14 in a manner well understood. The draft chains 30 extend substantially in a horizontal position and sustain the stress incident to the operation of the cutting blades when the implement is in active operation. The pitch or depth of action of the cutting blades 33 may be regulated by adjusting the effective lengths of the suspending chains 31 and 32.

The rake, disposed in the rear of each of the cutting blades 33, comprises tines 37 and a connecting bar 38. The tines 37 may be secured to the bar 38 in any manner and are attached to the respective cutting blades 33 to admit of the rake as a whole having a shaking or vibratory movement. The forward ends of the tines 37 pass through the openings 35 formed in the downturned portion 34 of the cutting blades. The shaking rakes are held in position by bending the forward ends of certain tines to positively engage the downturned edge portion 34. Certain tines have their forward ends bent laterally, as indicated at 39, and other tines have their forward ends terminating in eyes 40 which are looped about portions of the downturned edge 34. Links 41 connect the crank portion 18 of the shaft 17 with the bar 38 of the respective shaking rakes. The rakes perform the office of separators whereby to remove roots, weeds and the like from the soil and deposit the same upon the top thereof.

The implement operates chiefly as a pulverizer and leveler to prepare plowed land for the reception of seeds, thereby performing the dual office of clod crushing and earth pulverizing and leveling. As the machine is drawn over the plowed field, the cutting blades 33 pass beneath the soil and elevate the same thereby crushing and breaking up clods and leveling the soil. The earth passing over the rakes in the rear of the cutting blades 33, is further loosened and leveled and weeds, roots and the like contained therein are separated and deposited upon the top of the ground. The earth passes through the spaces formed between the tines 37 and the roots, weeds and the like are retained upon said tines and escape from the rear thereof, the separating action being facilitated by the shaking or vibratory movement imparted to the rakes, as will be readily understood.

What is claimed is:

1. In an implement of the character specified, a supporting frame, a cutting blade, front and rear suspending chains for the cutting blade, and draft sustaining chains.

2. In an implement of the character specified, a supporting frame, a cutting blade, front and rear suspending chains for the cutting blade, and draft sustaining chains, said suspending chains being adapted to have their effective lengths varied whereby to regulate the pitch and the depth of action of the cutting blade.

3. In an implement of the character specified, a supporting frame, a cutting blade, front and rear suspending chains for the cutting blade, draft sustaining chains, an operating lever operatively connected with the cutting blade to effect adjustment thereof, and means for securing the operating lever in the required adjusted position.

4. In an implement of the character specified, a supporting frame, a cutting blade, front and rear suspending chains for the cutting blade, draft sustaining chains, a longitudinally slotted bar supported by the main frame and having teeth along the length of the slot, an operating lever connected with the cutting blade to effect adjustment thereof and adjustable in the longitudinal slot of said bar, and means associated with the lever and coacting with the teeth of the bar to hold the lever and cutting blade in adjusted position.

5. In an implement of the character specified, a supporting frame including a longitudinally slotted arched bar having teeth at one side of the slot, a cutting blade, a bail having connection with opposite end portions of the cutting blade, an operating lever extending from said bail and passing through the slot of the arched bar, and means associated with the lever and coacting with said teeth of the arched bar to hold the cutting blade in required adjusted position.

6. In an implement of the character specified, a supporting frame including a longitudinally slotted arched bar having teeth at one side of the slot, a cutting blade, a bail having connection with opposite end portions of the cutting blade, an operating lever extending from said bail and passing through the slots of the arched bar, means associated with the lever and coacting with said teeth of the arched bar to hold the cutting blade in required adjusted position, a separating device in the rear of the cutting blade and having loose connection therewith, a crank shaft, and connecting means between the crank shaft and separating device for imparting vibratory movement thereto.

7. In an implement of the character specified, a supporting frame, a rear axle having ground wheels rotatable therewith, sprocket wheels loose upon the axle and having clutched engagement therewith, crank shafts connected with the respective sprocket wheels, adjustable cutting blades, separating devices having loose connection with the respective cutting blades, and connecting means between the crank shaft and separating devices for imparting vibratory movement thereto.

In testimony whereof I affix my signature in presence of two witnesses.

HENRY A. JOHNSON.

Witnesses:
H. B. GEORHAM,
K. S. WAUG.